United States Patent
Decker et al.

(10) Patent No.: US 11,980,132 B2
(45) Date of Patent: May 14, 2024

(54) DETERMINING ORIENTATION OF A MOWER USING HORIZON MAPPING

(71) Applicant: FireFly Automatix, Inc., Salt Lake City, UT (US)

(72) Inventors: William M. Decker, Salt Lake City, UT (US); Walter E. Gunter, Jr., Eagle Mountain, UT (US)

(73) Assignee: FireFly Automatix, Inc., Salt Lake City, UT (US)

( * ) Notice: Subject to any disclaimer, the term of this patent is extended or adjusted under 35 U.S.C. 154(b) by 419 days.

(21) Appl. No.: 17/405,925

(22) Filed: Aug. 18, 2021

(65) Prior Publication Data

US 2023/0055140 A1 Feb. 23, 2023

(51) Int. Cl.
*A01D 34/00* (2006.01)
*A01D 75/28* (2006.01)

(52) U.S. Cl.
CPC .......... *A01D 75/28* (2013.01); *A01D 34/008* (2013.01)

(58) Field of Classification Search
CPC .... A01D 75/28; A01D 34/008; G05D 1/0246; G05D 1/0088; G05D 1/0274; G05D 1/0253; G05D 1/0272; G05D 1/021; G06V 20/58; G06V 20/10; G06V 10/751
USPC .......................................................... 701/50
See application file for complete search history.

(56) References Cited

U.S. PATENT DOCUMENTS

| | | | | |
|---|---|---|---|---|
| 5,721,679 A | * | 2/1998 | Monson | A01B 79/005 701/50 |
| 5,751,576 A | * | 5/1998 | Monson | A01B 79/005 239/161 |
| 5,974,348 A | * | 10/1999 | Rocks | A01D 46/30 701/28 |
| 7,140,830 B2 | * | 11/2006 | Berger | E02F 9/24 414/699 |
| 7,584,020 B2 | * | 9/2009 | Bruemmer | G05D 1/024 701/25 |
| 8,942,964 B2 | * | 1/2015 | McWilliams, III | G09B 9/48 434/38 |
| 9,008,886 B2 | * | 4/2015 | Braunstein | G05D 1/0276 701/2 |
| 10,139,832 B2 | * | 11/2018 | Sarkar | B60W 30/00 |
| 11,768,498 B2 | * | 9/2023 | Borgstadt | A01B 79/005 701/50 |
| 2003/0021445 A1 | * | 1/2003 | Larice | G06T 7/00 348/148 |

(Continued)

FOREIGN PATENT DOCUMENTS

CA 3065154 A1 * 12/2018 .......... A01B 69/008

*Primary Examiner* — Jonathan L Sample
(74) *Attorney, Agent, or Firm* — Kirton McConkie; Brian Tucker

(57) ABSTRACT

A mower's control system can maintain horizon maps that associate horizon features with known relative positions. When a mower's orientation is unknown, the control system can obtain an image that captures the horizon from the mower's current viewpoint. The control system can process the image to detect any horizon features that appear within the image and to determine their positions within the image. The control system can then access a horizon map to identify matching horizon features. The control system can compare the known relative positions of any matching horizon features with the positions of the horizon features within the image to thereby determine the mower's current orientation.

20 Claims, 12 Drawing Sheets

(56) References Cited

U.S. PATENT DOCUMENTS

| | | | |
|---|---|---|---|
| 2009/0312908 A1* | 12/2009 | Van Den Brink | B62D 9/02 |
| | | | 280/5.509 |
| 2011/0169949 A1* | 7/2011 | McCain | E02F 3/847 |
| | | | 348/148 |
| 2012/0069019 A1* | 3/2012 | Richards | G06T 7/536 |
| | | | 345/419 |
| 2012/0277932 A1 | 11/2012 | Anderson | |
| 2014/0198955 A1* | 7/2014 | Deigmoeller | G06T 7/223 |
| | | | 382/107 |
| 2015/0163993 A1 | 6/2015 | Pettersson | |
| 2017/0168498 A1* | 6/2017 | Nakajima | G01C 21/3837 |
| 2019/0011927 A1* | 1/2019 | Mou | G06V 20/56 |
| 2019/0128690 A1 | 5/2019 | Madsen et al. | |
| 2019/0150357 A1 | 5/2019 | Wu et al. | |
| 2019/0196497 A1* | 6/2019 | Eoh | G06F 16/29 |
| 2021/0124057 A1* | 4/2021 | Luo | G01S 19/21 |
| 2021/0382476 A1* | 12/2021 | Morrison | G05D 1/0038 |
| 2022/0007571 A1* | 1/2022 | Foster | G05D 1/0257 |
| 2022/0066456 A1* | 3/2022 | Ebrahimi Afrouzi | |
| | | | G06F 3/04883 |
| 2022/0369545 A1* | 11/2022 | Kaufman | G01D 21/00 |

* cited by examiner

DETERMINING ORIENTATION OF A MOWER USING HORIZON MAPPING

CROSS-REFERENCE TO RELATED APPLICATIONS

N/A

BACKGROUND

Expansive grassy areas such as sod farms, golf courses, sports fields, parks, etc. are oftentimes cut frequently using large mowers. For example, a sod farm may be cut multiple times a week. Labor costs associated with such mowing can be significant.

With recent advancements in automation, some mower manufacturers have developed autonomous mowers. These autonomous mowers can be driven with minimal oversight using GPS or other geolocation techniques thereby reducing the labor costs associated with frequent mowing.

With GPS-based techniques, once the mower is moving, a single GPS receiver can be used to steer the mower. In particular, the GPS readings from a single GPS receiver over time will dictate the direction the mower is heading which in turn defines the orientation of the mower (i.e., the orientation will match the direction). In contrast, when the mower is first powered on (or is otherwise stationary without any stored GPS readings that would define its direction of travel before becoming stationary), GPS readings from a single GPS receiver will be insufficient to determine the mower's orientation. In other words, from the GPS readings generated while the mower is stationary, it will be possible to determine the mower's location but not its orientation in that location. In such a case, and assuming the mower does not use any other technique to determine orientation, the mower would have to start moving before the GPS readings from the single GPS receiver would reveal its orientation.

This requirement that the mower start moving before knowing its orientation can be very problematic. For example, if a mower was parked facing an obstacle and then powered off, when the mower's control system is powered back on and begins receiving GPS readings from a single GPS receiver, the control system will only be able to determine that the mower is adjacent to the obstacle. The control system will likely be unable to determine whether the mower is facing the obstacle, has its rear to the obstacle, has its side to the obstacle, etc. Although the control system could determine the mower's orientation by driving the mower forward, it would run the risk of colliding with the obstacle before it was able to determine that it is facing the obstacle.

To address such issues, a mower may include multiple GPS receivers that are positioned at known locations on the mower. With multiple GPS receivers, the control system can rely on the differences between the GPS readings from the multiple GPS receivers to determine the mower's orientation. However, using multiple GPS receivers adds significant costs and, once the orientation of the mower is known, the multiple GPS receivers are not needed to steer the mower.

As another option, a mower may employ magnetometers to determine orientation. However, magnetometers are substantially less accurate than using multiple GPS receivers and again, once the orientation of the mower is known, the magnetometer(s) are not needed to steer the mower.

Another possible solution would be to store the orientation of the mower whenever it stops moving and/or powers off. In such cases, the mower's control system could presume that the mower's actual orientation is the stored orientation. However, given the possibility that a stored orientation may be corrupted or that the mower could be moved when the control system is not active, this potential solution does not adequately minimize the risk of a collision. Another possible solution would be to always park the mower in the same location and orientation. However, this is impractical and may limit the area for which the mower can be safely used.

BRIEF SUMMARY

Embodiments of the present invention extend generally to methods for determining the orientation of a mower using horizon mapping and to mowers and mower control systems that are configured to perform such methods. A mower's control system can maintain horizon maps that associate horizon features with known relative positions. When a mower's orientation is unknown, the control system can obtain an image that captures the horizon from the mower's current viewpoint. The control system can process the image to detect any horizon features that appear within the image and to determine their positions within the image. The control system can then access a horizon map to identify matching horizon features. The control system can compare the known relative positions of any matching horizon features with the positions of the horizon features within the image to thereby determine the mower's current orientation.

In some embodiments, the present invention may be implemented as a mower that includes: a main body; one or more mower decks supported by the main body; a camera; an autonomy controller that is configured to receive one or more images from the camera; and a machine controller that controls a ground speed of the mower. The autonomy controller can be configured to perform a method for determining an orientation of the mower using horizon mapping. The autonomy controller can receive, from the camera, an image that captures the horizon. The autonomy controller may then generate, from the image, a horizon feature set. The horizon feature set may identify at least one horizon feature that appears in the image and a position of the at least one horizon feature within the image. The autonomy controller may compare the horizon feature set to a first horizon map. The first horizon map may identify horizon features and relative positions of the horizon features. Based on the comparison, the autonomy controller may determine that a first horizon feature of the at least one horizon feature identified in the horizon feature set matches a first horizon feature of the horizon features identified in the first horizon map. The autonomy controller may then determine an orientation of the mower from the position of the first horizon feature within the image as defined in the horizon feature set and the relative position of the first horizon feature as defined in the first horizon map.

In some embodiments, the present invention may be implemented as a method for determining an orientation of a vehicle using horizon mapping. An image which captures the horizon can be received from a camera positioned on the vehicle. A horizon feature set can be generated from the image. The horizon feature set can identify at least one horizon feature that appears in the image and a position of the at least one horizon feature within the image. The horizon feature set can be compared to a first horizon map. The first horizon map can identify horizon features and relative positions of the horizon features. Based on the comparison, it can be determined that a first horizon feature of the at least one horizon feature identified in the horizon feature set matches a first horizon feature of the horizon features identified in the first horizon map. An orientation of the vehicle can then be determined from the position of the first horizon feature within the image as defined in the horizon feature set and the relative position of the first horizon feature as defined in the first horizon map.

In some embodiments, the present invention may be implemented as control system of a mower that includes a camera and an autonomy controller that is configured to receive images from the camera. The autonomy controller can be configured to determine an orientation of the mower using horizon mapping. The autonomy controller can receive, from the camera, an image that captures the horizon while the mower is stationary. The autonomy controller can process the image to generate image-based data representing a horizon feature that appears in the image. The autonomy controller can compare the image-based data representing the horizon feature that appears in the image to a first horizon map. The first horizon map can identify horizon features and relative positions of the horizon features. Based on the comparison, the autonomy controller can determine that a first horizon feature of the horizon features identified in the first horizon map is a match. The autonomy controller can determine a difference between the relative position of the first horizon feature of the horizon features identified in the first horizon map and a position within the image of the image-based data representing the horizon feature. The autonomy controller can calculate the orientation of the mower based on the determined difference.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, the term "mower" should be construed as equipment that can be propelled across the ground and that is capable of cutting grass. One of skill in the art would understand that there are many different types and configurations of mowers. Therefore, although the following description will employ an example where the mower is in the form of a tractor that supports a number of mower decks, it should be understood that any type of mower could be configured to implement embodiments of the present invention. The term "mower deck" should be construed as a component of a mower that houses one or more cutting blades. A mower that is configured to implement embodiments of the present invention may include one or more mower decks.

Figure 1:
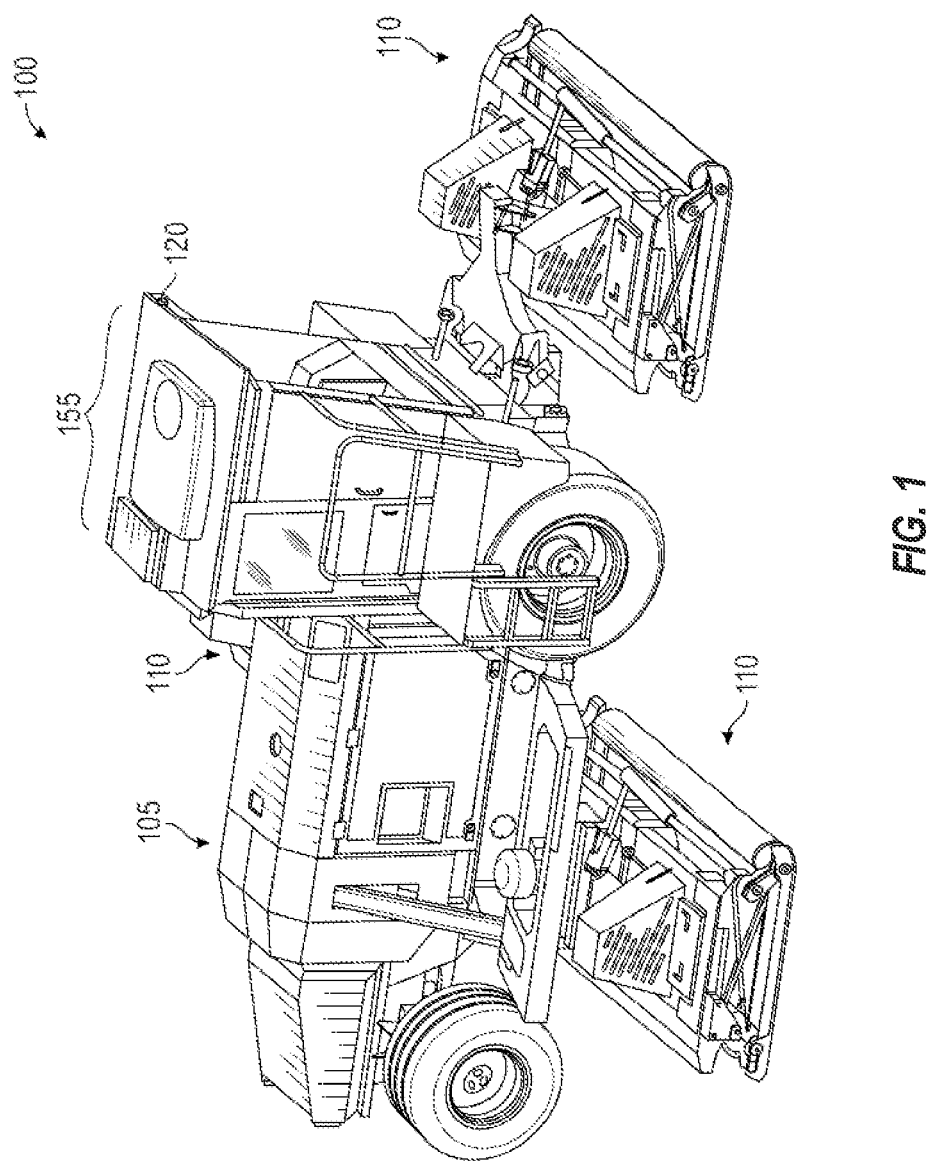
FIG. 1 illustrates an example of a mower that is configured in accordance with one or more embodiments of the present invention.

FIG. 1 provides one example of a mower 100 that is configured in accordance with embodiments of the present invention. Mower 100 is in the form of a tractor having a main body 105 from which three mower decks 110 are supported. A cab 155 is positioned towards a front of main body 105 and may be configured to house an operator. However, embodiments of the present invention are directed to enabling mower 100 to be autonomous, and therefore, no operator needs to be present within cab 155 during operation.

In the depicted example, a camera 120 is positioned on cab 155 and faces forward. This positioning, however, is merely one example. In other examples, camera 120 could be at a different location on main body 105, on mower decks 110 or on some other portion of mower 100 and could be oriented in any direction. Also, in some embodiments, multiple cameras 120 could be included on mower 100. For example, one camera 120 could face forward and another camera 120 could face rearward. Accordingly, although the present invention will be described using an example where mower 100 includes a single camera 120, embodiments of the present invention can employ at least one camera 120.

Figure 2:
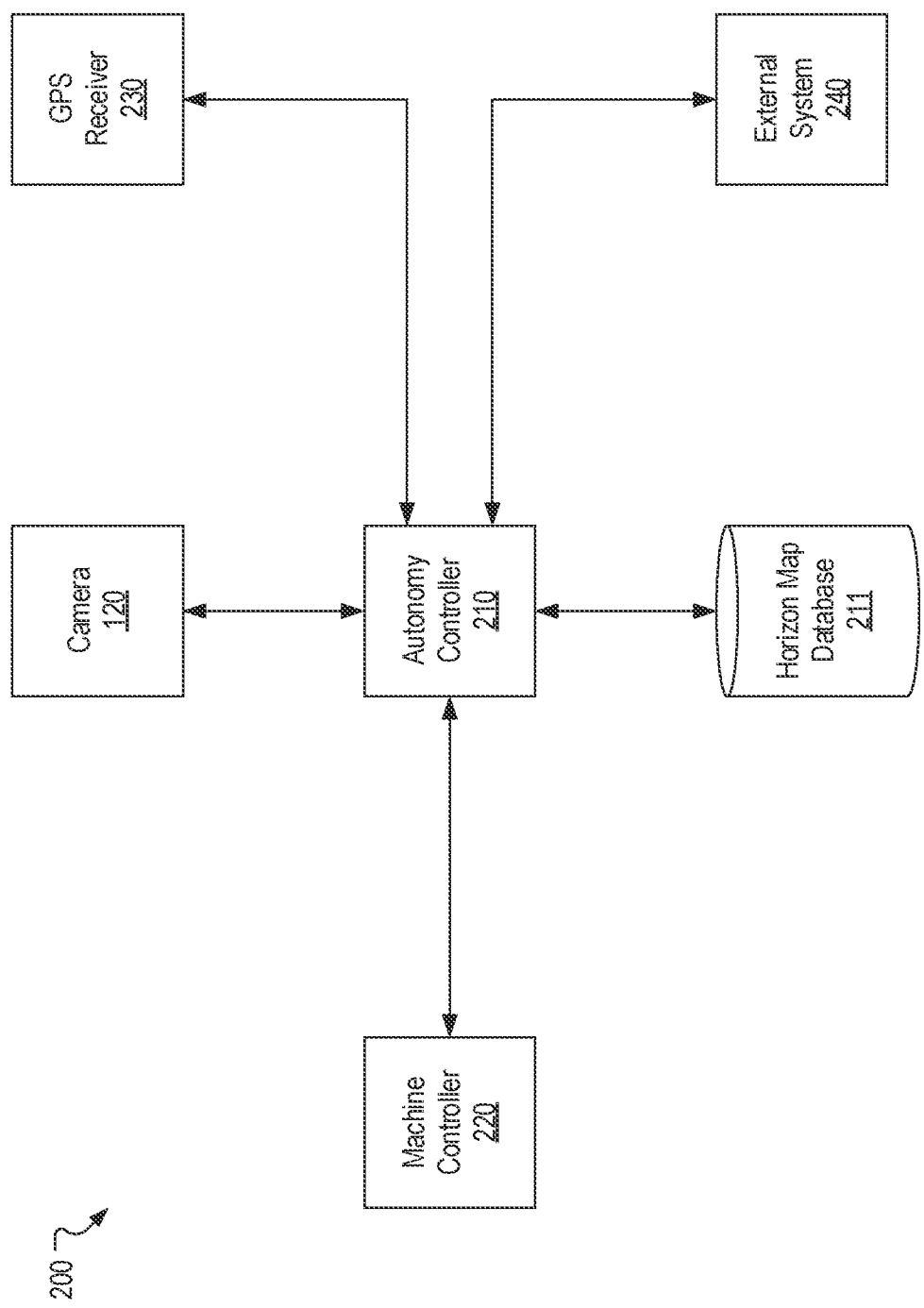
FIG. 2 is a block diagram representing various computing components that may be included on the mower of FIG. 1 to enable the mower to implement one or more embodiments of the present invention.

FIG. 2 illustrates an example of a control system 200 that may be employed on a mower, such as mower 100, to enable the mower to detect its orientation using horizon mapping in accordance with embodiments of the present invention. Control system 200 includes an autonomy controller 210, a horizon map database 211, a machine controller 220 camera 120 and a GPS receiver 230, all of which may be incorporated into or on mower 100. In some embodiments, control system 200 may include or be interfaced with an external system 240. In some embodiments, horizon map database 211 could be at least partially maintained on external system 240 as opposed to on mower 100.

Autonomy controller 210 can be implemented with any suitable hardware- and/or software-based circuitry including, but not limited to, a central processing unit, a microprocessor, a microcontroller, a field programming gate array, an application-specific integrated circuit, a system on a chip, etc. Autonomy controller 210 is coupled to camera 120 to receive and process images that camera 120 captures. Of primary relevance, these images can be those that camera 120 captures when mower 100 is started or when mower 100's orientation is otherwise unknown.

Machine controller 220 can represent the components that drive mower 100. In some embodiments, machine controller 220 can represent a drive-by-wire system. Of primary relevance to the present invention, machine controller 220 can be configured to steer and control the ground speed of mower 100 in response to control signals received from autonomy controller 210.

GPS receiver 230 can represent any circuitry that is configured to generate GPS-based location information. External system 240 may represent any computing device that is capable of communicating with autonomy controller 210. In one example, external system 240 could include a computing device (e.g., a smart phone or tablet with an app, a desktop or mobile device logged into a website, a dedicated device, etc.) that an operator has registered with autonomy controller 210 or otherwise associated with mower 100. In such cases, the operator (e.g., a manager of a sod farm, golf course, park, etc.) could employ external system 240 to monitor the operation of mower 100 when it is autonomous or even while riding in mower 100. In another example, external system 240 could be a cloud-based artificial intelligence engine that receives images captured by camera 120.

Figure 3:
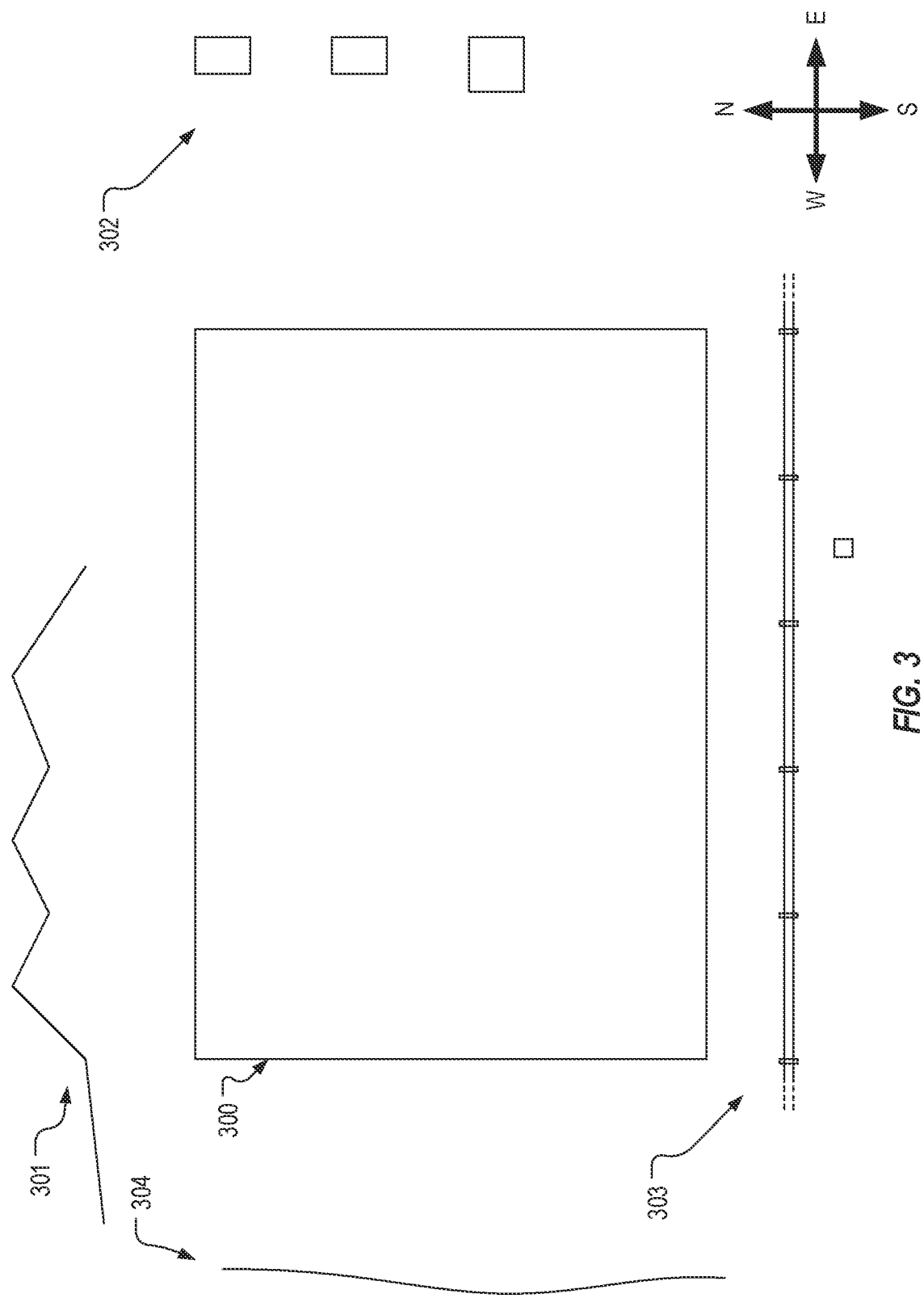
FIG. 3 provides a simple example of a grassy area that is surrounded by a number of features.

FIG. 3 provides a simple example of a rectangular grassy area 300 that mower 100 could be used to cut. Grassy area 300 is surrounded by a number of landmarks that would appear in the horizon when looking outwardly from grassy area 300. For example, a mountain range 301 may be to the north of grassy area 300, buildings 302 may be to the east of grassy area 300, communication structures 303 may be to the south of grassy area 300 and rolling hills 304 may be to the west of grassy area 300.

FIGS. 4A-4D provide simple examples of images 401-404 representing how the horizon may appear when looking from grassy area 300 towards the north, east, west and south respectively. In this context, the term horizon should be construed as encompassing its standard definition—where the earth's surface meets the sky. However, for purposes of this disclosure and the claims, the horizon should also be construed as being defined by objects such as buildings, trees, communication towers, etc. that extend upwardly from the earth's surface. Accordingly, the term "horizon" can be viewed as an outline of where the sky meets the earth's surface or objects on the earth's surface.

The term "horizon feature" can be construed as an identifiable portion of the horizon. For example, in FIG. 4A, image 401 captures mountain range 301 which could be viewed as creating seven different horizon features 301a-301g where each different horizon feature is a different slope of mountain range 301. Similarly, in FIG. 4C, image 403 captures rolling hills 303 which could be viewed as creating three different horizon features 303a-303c where each different horizon feature is a different section of the rolling hills. Such terrain-based horizon features could be identified in image 401 or 403 by using image processing techniques to detect rapid changes in pixel values between the mountain or hills and the sky. For example, image processing techniques could be employed to determine that horizon feature 301b is present in image 401 by identifying an upwardly sloping line along which the pixel values rapidly transition from brown to blue (e.g., if image 401 were taken during the daytime) or from a dark color to a darker color (e.g., if image 401 were taken during the night). The slope, length, curvature, non-linear features, etc. of any line detected in this manner could be used to uniquely identify the presence of a particular horizon feature in any given image. Accordingly, although FIGS. 4A-4D provide simple examples of terrain that may define the horizon, it should be understood that horizon features may have complex and varying shapes.

Figure 4A:
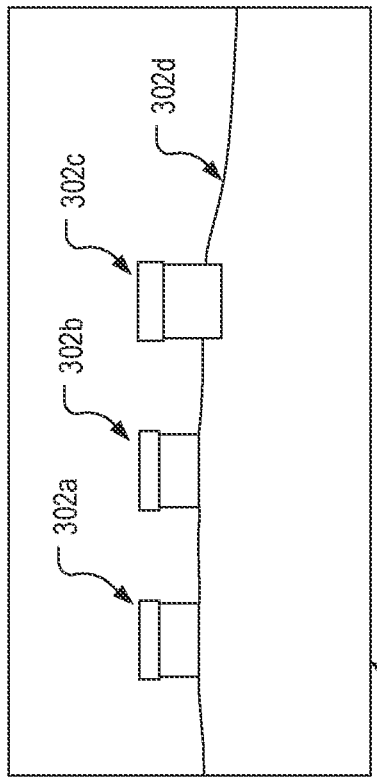
FIGS. 4A-4D provide simple examples of how the features of FIG. 3 may appear in the horizon when viewed from the grassy area.
Figure 4B:
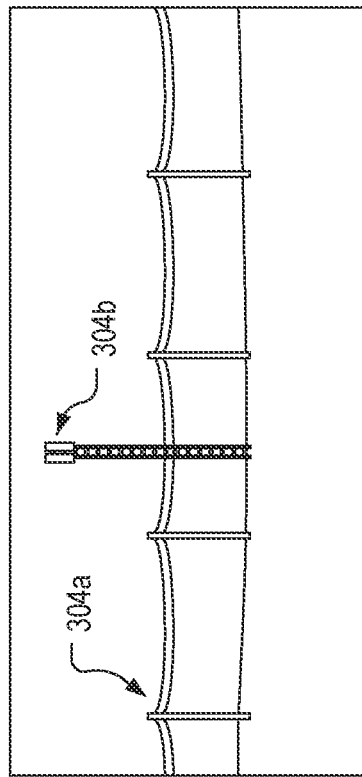
Figure 4C:
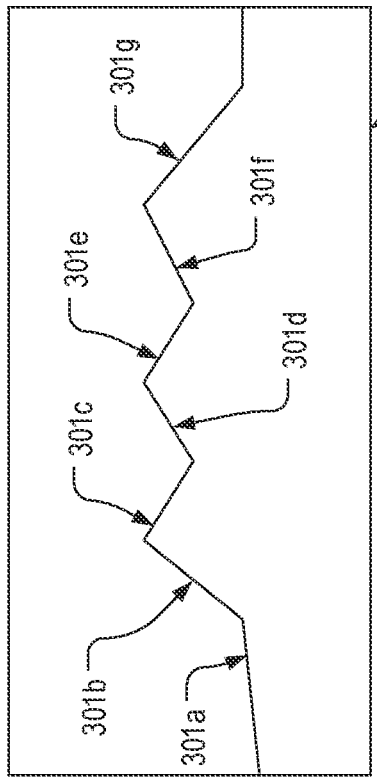
Figure 4D:
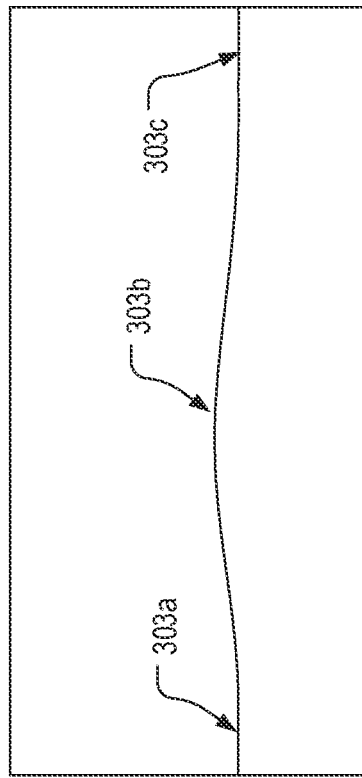

Similar image processing techniques could be employed to detect horizon features 302a-302c representing buildings in image 402 of FIG. 4B, communication structures 304 of FIG. 4D or any other object that may be surrounded by the sky in an image or otherwise detectable within an image (e.g., the outline of a tree). For example, to detect the presence of any of horizon features 302a-302c in image 402, it could be determined that a square-shaped object is surrounded by blue.

In some embodiments, a horizon feature may also be an identifiable object within an image that captures the horizon. For example, an object may not extend into the sky in an image that captures the horizon but may still be detectable. As an example, a large building located on a mountain may be detectable within an image even though it is not surrounded by the sky due to differences between the building's color and the mountain's color.

In some embodiments, the presence of lights on a building or other highly contrasting features of an object may be leveraged to enable more precise detection of horizon features. For example, a building with lights or highly reflective windows may be selected as a horizon feature given that the lights or windows may create a stark contrast with the surrounding sky. Likewise, communication towers or other uniquely-shaped structures may be leveraged.

Figure 5:
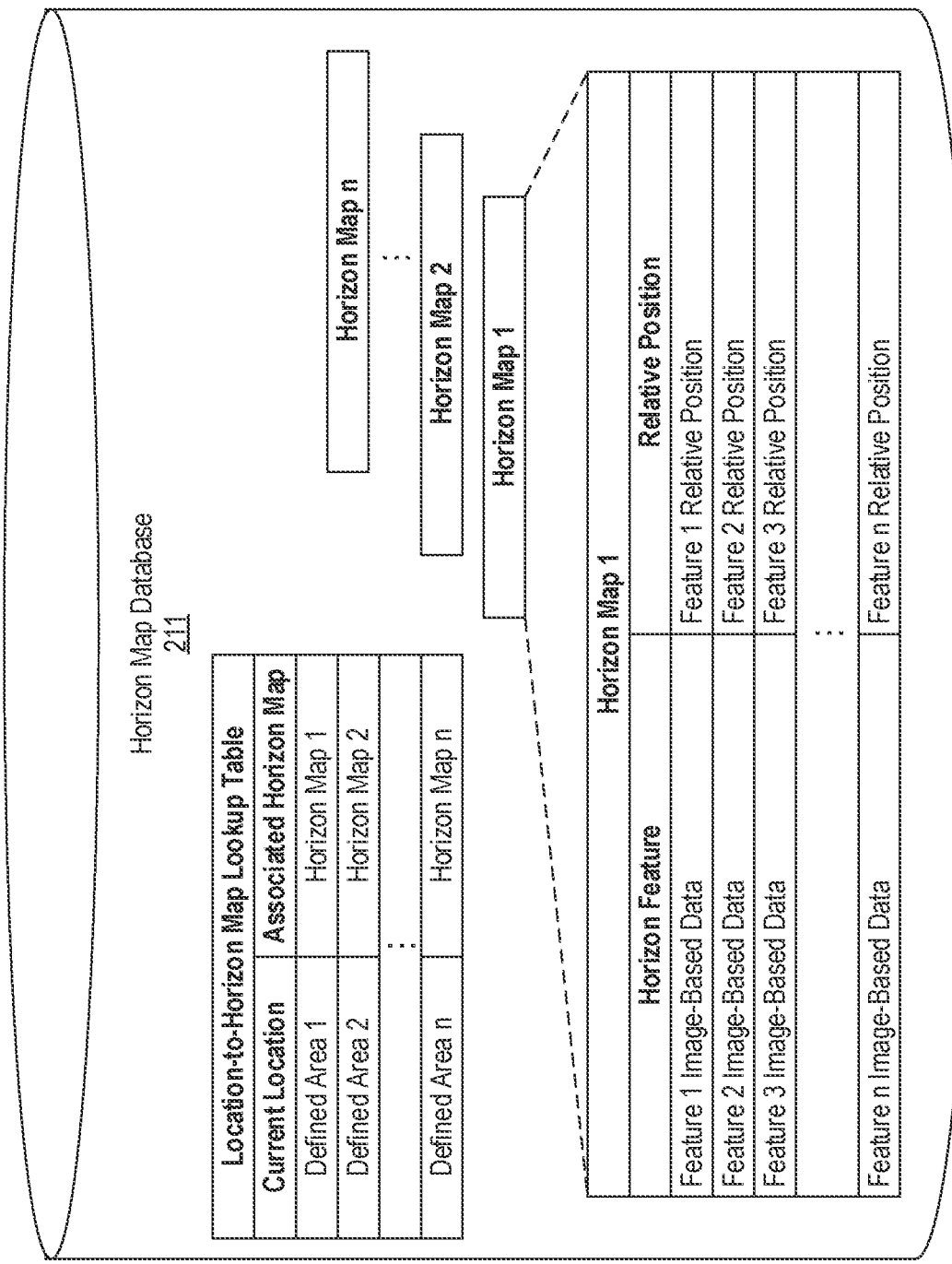
FIGS. 5 and 5A provide examples of various data structures that may be employed in embodiments of the present invention.
Figure 6:
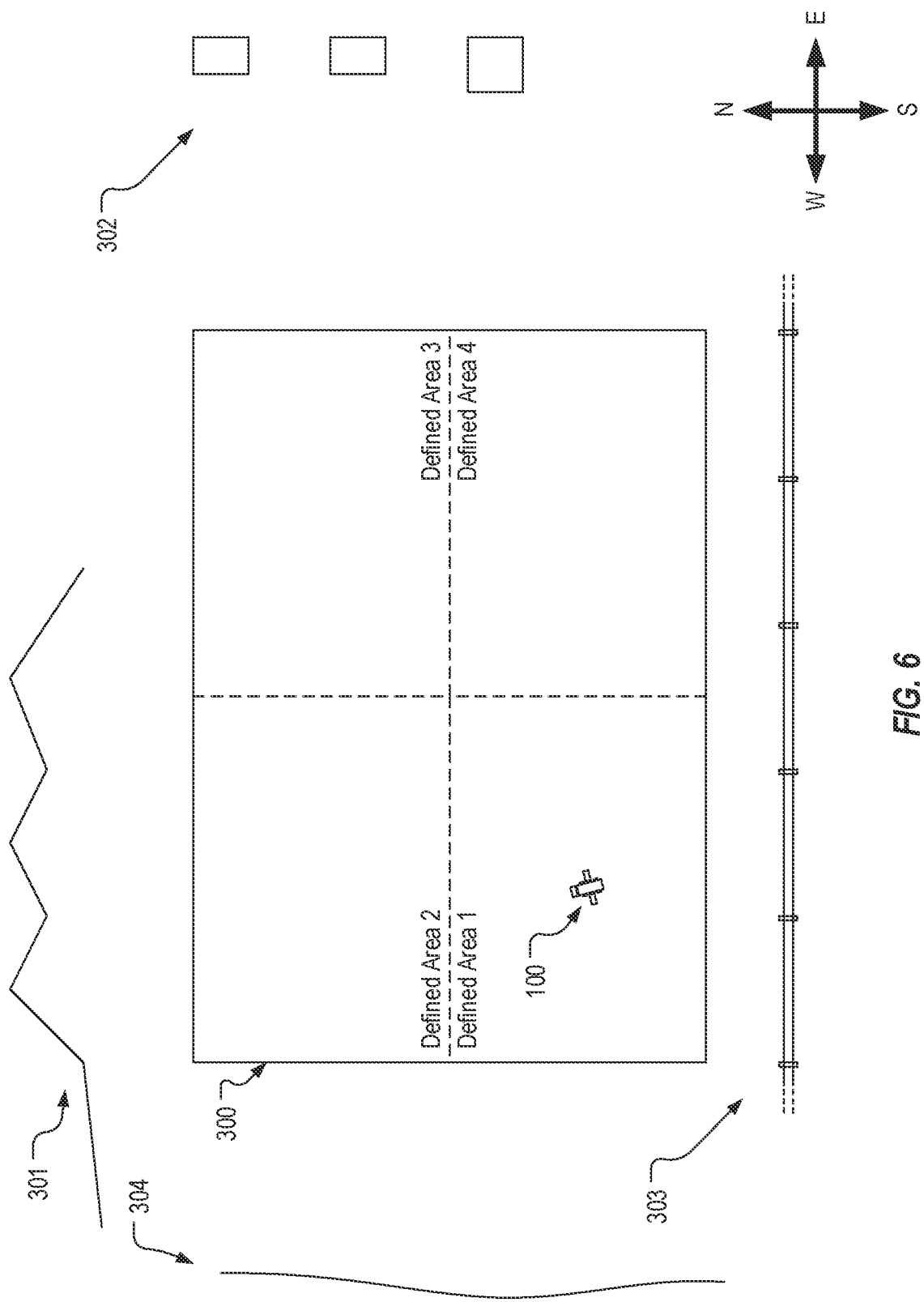
FIG. 6 provides an example where a sod harvester may be located within a defined area while its orientation is unknown.

FIG. 5 provides an example of various data structures and/or information that horizon map database 211 may maintain to enable a mower's orientation to be determined using horizon mapping. As shown, horizon map database 211 may include one or more horizon maps. Each horizon map may be specific to a particular area that mower 100 may cut. Accordingly, horizon map database 211 may also maintain a location-to-horizon map lookup table which associates a defined area with a particular horizon map. In this example, it is presumed that each horizon map in horizon map database 211 is particular to a defined area or portion of grassy area 300 as represented in FIG. 6. Notably, if the grassy area is large, which grassy area 300 is presumed to be, it is possible that the horizon may appear differently in different areas of the grassy area.

A horizon map can be created by associating horizon features with relative positions. In this context, a relative position is the position where the horizon feature will appear in the horizon when viewed from the defined area with which the horizon map is associated. As an example only, a horizon feature that appears directly to the north may be at a relative position of 0 degrees, while a horizon feature that appears directly to the south may be at a relative position of 180 or −180 degrees.

In some embodiments, autonomy controller 210 may create or update a horizon map while mower 100 is operating. In particular, while mower 100 is travelling, autonomy controller 210 will be able to detect mower 100's location and orientation using GPS data. With such knowledge, autonomy controller 210 can receive images from camera 120 and process them to detect the presence of horizon features and their relative position. As an example, while mower 100 is travelling directly north in grassy area 300, autonomy controller 210 could process an image of the horizon that captures mountain range 301. Through this processing, autonomy controller 210 could detect horizon features 301a-301g and determine their angles relative to north (e.g., how far to the left or right of center the horizon features appear in the image). By knowing mower 100's location when the image was captured, autonomy controller 210 could identify the appropriate horizon map that is associated with that location and could then add entries to the identified horizon map for any detected horizon feature. In this way, autonomy controller 212 could build and update horizon maps for any grassy area it may cut.

In other embodiments, a horizon map could be created and/or updated using a separate computing system or another mower and then populated into horizon map database 211. Accordingly, embodiments of the present invention should not be limited to any particular way in which a horizon map may be created or updated.

Figure 5A:
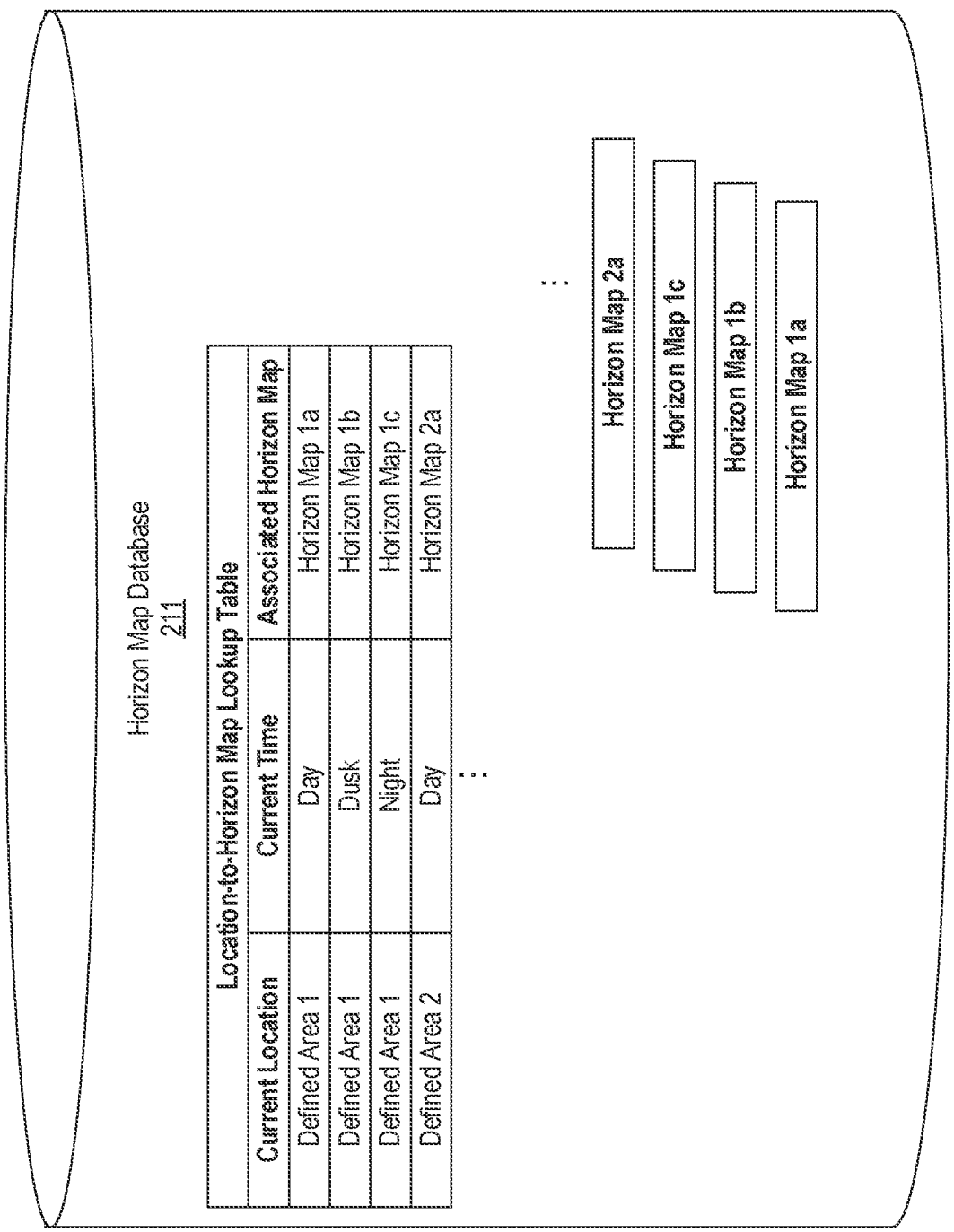

In some embodiments, a horizon map may be associated with a time or season to thereby account for variations in the appearance of the horizon due to the time of day or year. For example, FIG. 5A shows that location-to-horizon map lookup table may map each horizon map to a particular defined area and a particular time of day.

FIG. 6 provides an example where mower 100 is assumed to be stopped within defined area 1 of grassy area 300. It is also assumed that autonomy controller 210 does not know the orientation of mower 100. Therefore, although autonomy controller 210 can determine mower 100's location using GPS data, it will not know whether mower 100 would travel north, south or any other direction if it were to instruct machine controller 220 to start driving. In this scenario, autonomy controller 210 could use horizon mapping to determine mower 100's orientation. FIGS. 7A-7E provide an example of how autonomy controller 210 may do so.

Figure 7A:
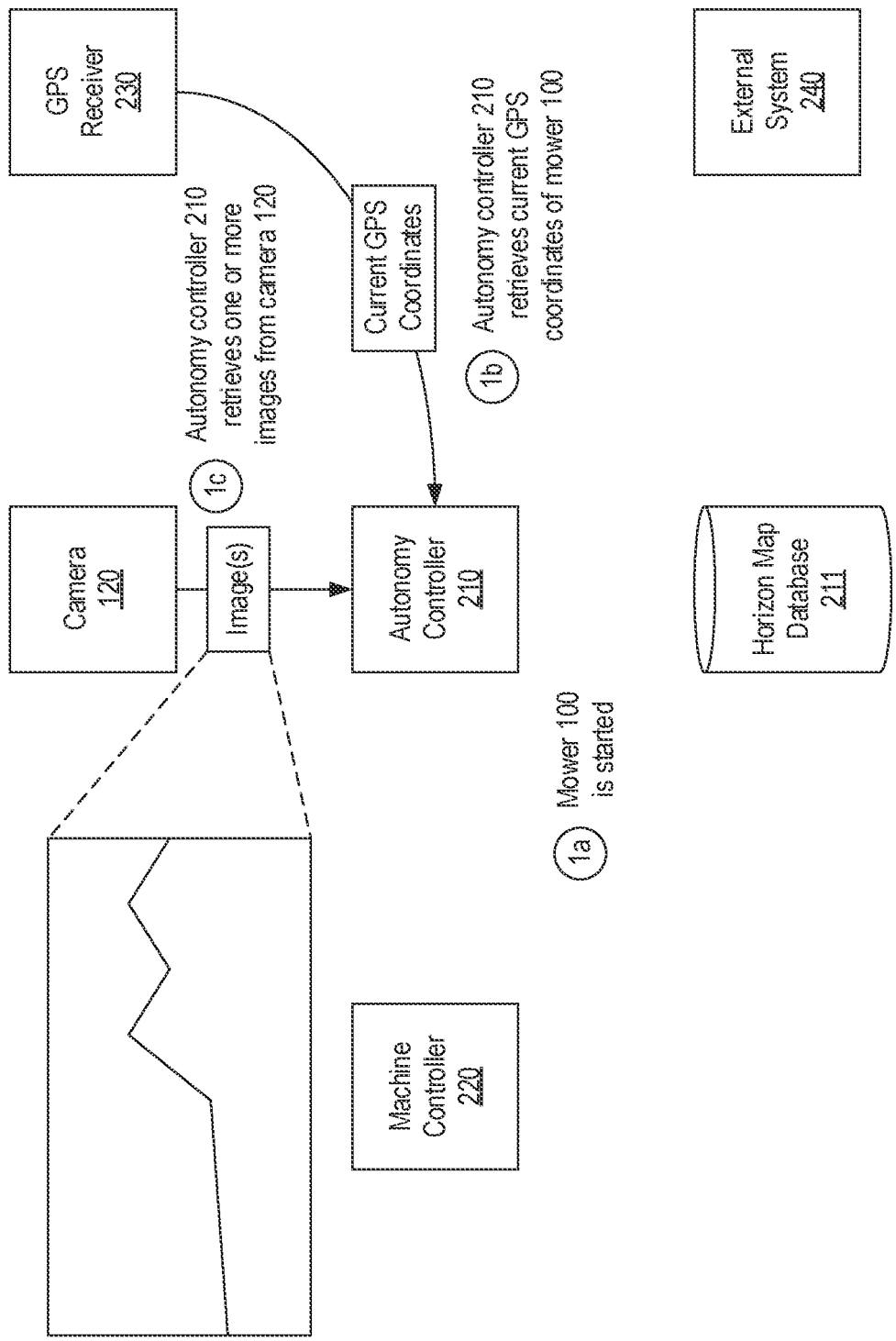
FIGS. 7A-7E provide an example of how an autonomy controller of a sod harvester's control system may determine the sod harvester's orientation using horizon mapping.

In FIG. 7A, it is assumed that, in step 1a, mower 100 is started. As stated above, it is also assumed that autonomy controller 210 does not know mower 100's orientation when mower 100 is started. In step 1b, autonomy controller 210 may commence receiving GPS coordinates from GPS receiver 230. In step 1c, autonomy controller 120 may also commence receiving images from camera 120. Notably, steps 1b and 1c can be performed before autonomy controller 210 instructs machine controller 220 to start driving mower 100.

Figure 7B:
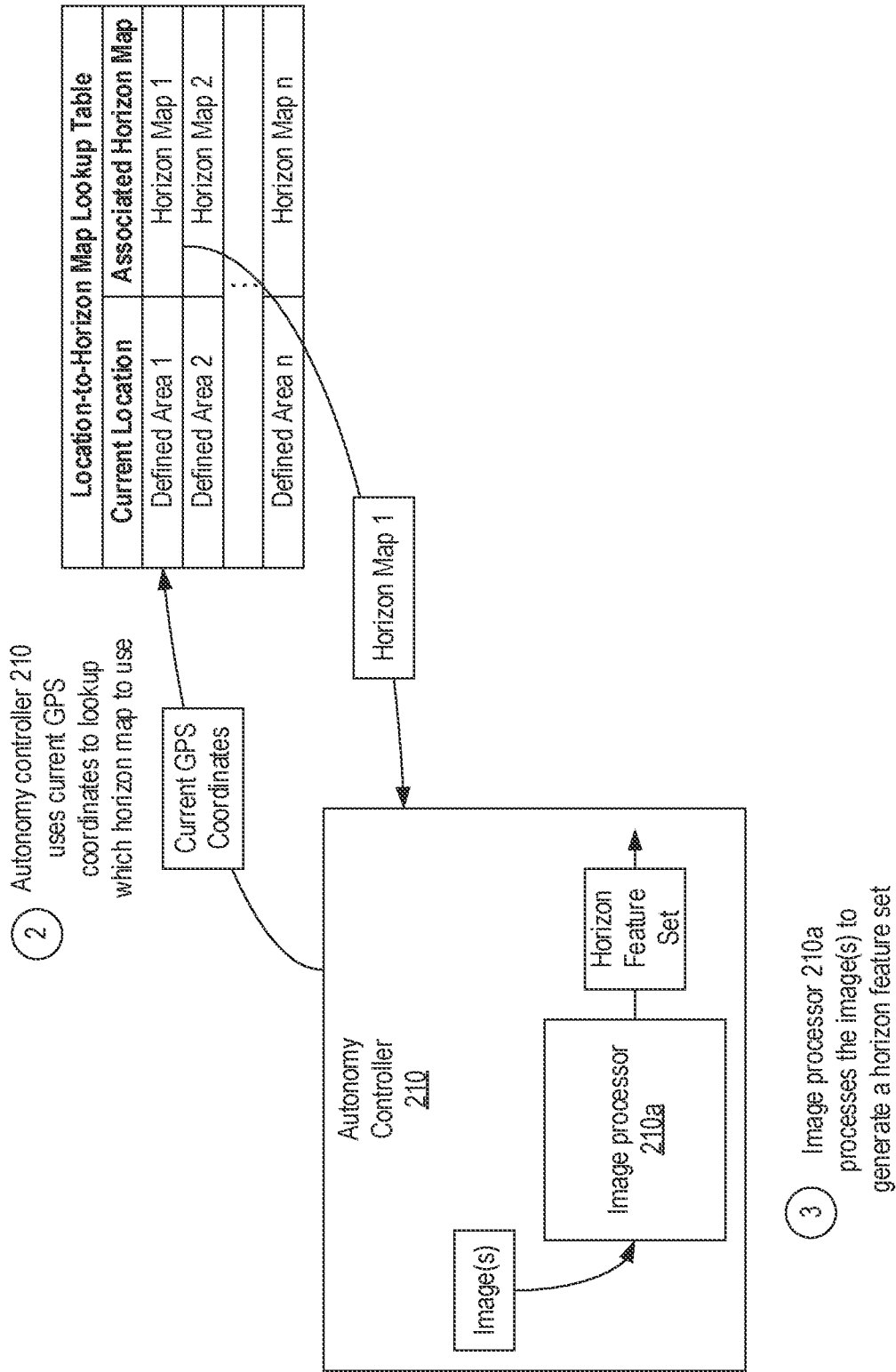

Turning to FIG. 7B, in step 2, autonomy controller 210 may use the current GPS coordinates (or location information derived from the current GPS coordinates) to query location-to-horizon map lookup table to obtain the horizon map that is associated with mower 100's current location. Notably, if only one horizon map is used, this step may not be necessary (i.e., autonomy controller 210 may be configured to use the same horizon map when determining orientation). In some embodiments, step 2 may entail determining within which defined area the current GPS coordinates fall. Although not shown, step 2 may also entail determining within which defined time or defined season the current time or current season falls. Accordingly, step 2 can be generally viewed as encompassing any technique by which autonomy controller 210 identifies a particular horizon map that it should use to determine mower 100's current orientation.

In step 3, an image processor 210a of autonomy controller 210 may process the image(s) that autonomy controller 210 received from camera 120 to thereby generate a horizon feature set. In other words, image processor 210a can process the currently captured image(s) of the horizon to determine which horizon features are included in the image(s). Step 3 may entail a similar process as described above. In particular, image processing techniques can be performed to detect changes in pixel values that occur at the boundaries between the sky and the horizon features.

Figure 7C:
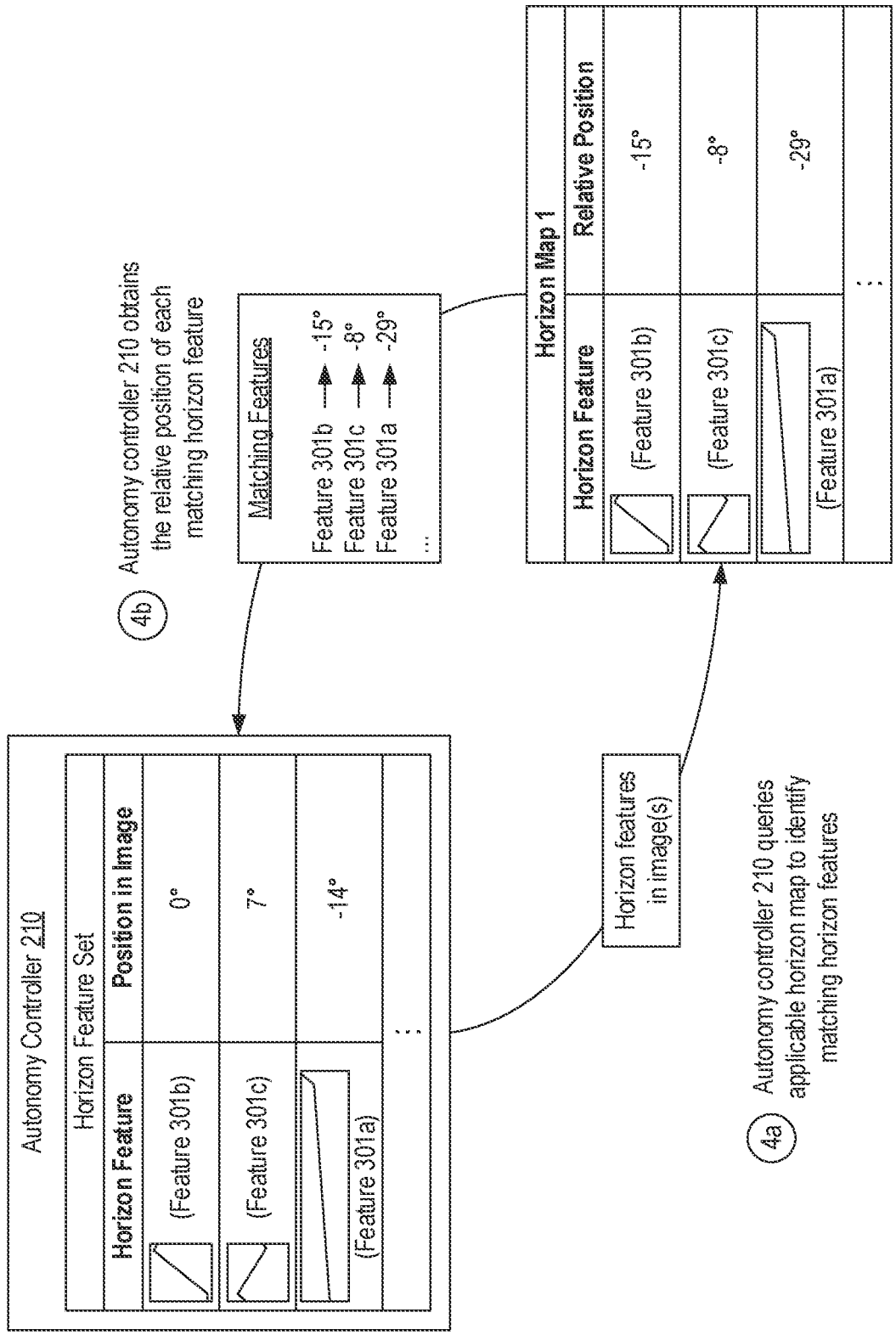

Turning to FIG. 7C, a simple example is provided of how a horizon feature set may be configured. As shown, the horizon feature set may identify a horizon feature and define its position within the current image of the horizon. In the example of FIG. 6, the horizon feature set may include horizon feature 301b and may define that it is at 0 degrees within the image (i.e., that horizon feature 301b is currently straight ahead of the current unknown orientation of mower 100). The horizon feature set may also include horizon feature 301c and may define that it is at 7 degrees within the image (i.e., that horizon feature 301c is 7 degrees to the right of the current unknown orientation of mower 100) and may also include horizon feature 301a and may define that it is at −14 degrees within the image (i.e., that horizon feature 301a is 14 degrees to the left of the current unknown orientation of mower 100). Accordingly, a horizon feature set associates a horizon feature with a position that is relative to the current unknown orientation of the mower, whereas a horizon map associates a horizon feature with a position that is relative to a known orientation/direction (e.g., north).

In step 4a, autonomy controller 210 can query the applicable horizon map to identify any horizon feature that matches a horizon feature included in the horizon feature set. For example, step 4a may entail comparing image-based data defining a horizon feature in the horizon feature set to image-based data defining horizon features in the horizon map. If the image-based data defining a horizon feature in the horizon feature set is the same as or highly similar to the image-based data defining a particular horizon feature in the horizon map, autonomy controller 210 can determine that the particular horizon feature appears in the current image of the horizon. For this example, it is assumed that autonomy controller 210 has determined that the horizon feature set includes image-based data that matches the image-based data defining horizon features 301a-301c in horizon map 1.

In step 4b, autonomy controller 210 can retrieve the relative position of each matching horizon feature. In other words, autonomy controller 210 can retrieve, from the horizon map, the relative position of any horizon feature that has been determined to appear in the current image of the horizon. For example, in FIG. 7C, it is assumed that horizon map 1 associates horizon feature 301b with a relative position of −15 degrees (i.e., 15 degrees to the west of north), associates horizon feature 301c with a relative position of −8 degrees and associates horizon feature 301a with a relative position of −29 degrees.

Figure 7D:
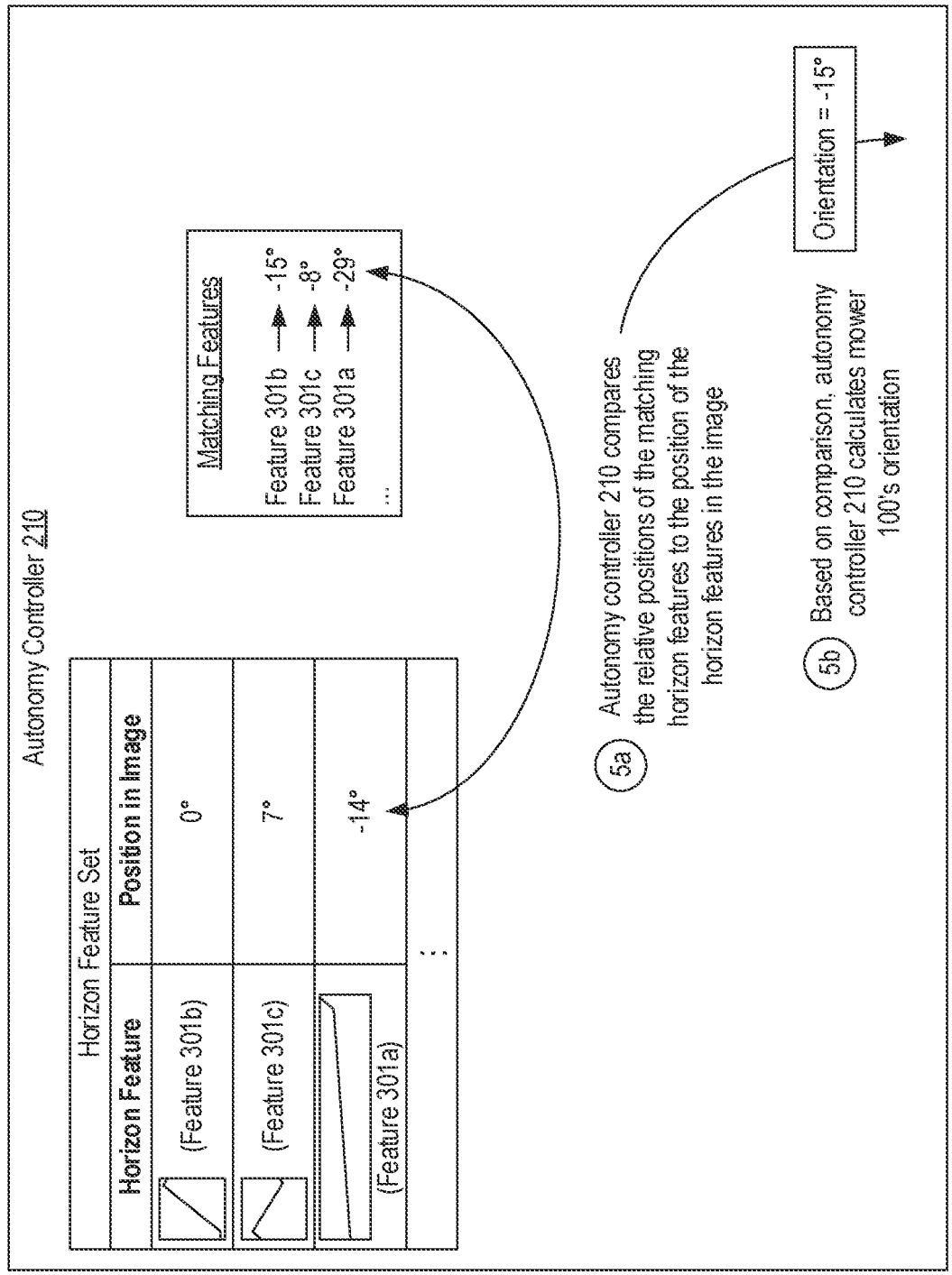

Turning to FIG. 7D, in step 5a, autonomy controller 210 can compare the relative positions of the matching horizon features to the positions of the corresponding horizon features in the image(s) as defined in the horizon feature set. For example, autonomy controller 210 can compare the position of horizon feature 301b as defined in the horizon feature set to the relative position of horizon feature 301b as defined in horizon map 1 to determine that they differ by −15 degrees.

In step 5b, and based on this comparison, autonomy controller 210 can calculate mower 100's orientation. For example, given that autonomy controller 210 has determined, from processing the current image(s), that horizon feature 301b is currently straight ahead of mower 100 and has also determined, from horizon map 1, that horizon feature 301b has a position of −15 degrees relative to north, autonomy controller 210 can determine that mower 100 is currently oriented at −15 degrees from north.

Accordingly, the horizon feature set identifies horizon features that appear in the horizon from camera 120's current viewpoint and defines the positions of these horizon features relative to the mower's current unknown orientation. The horizon map identifies horizon features that could be seen from any viewpoint while being located within a defined area and defines the positions of these horizon features relative to a known direction. By Autonomy controller 120 can correlate these two different positions for any matching horizon feature to determine mower 100's orientation.

Autonomy controller 210 may use horizon mapping to determine mower 100's orientation from one matching horizon feature. However, in some embodiments, autonomy controller 210 may match more than one horizon feature to provide added confidence and accuracy to the calculated orientation. For example, unlike what is shown in FIG. 7D, the orientation calculated from one matching horizon feature may not be the same as the orientation calculated from another matching horizon feature. In such cases, autonomy controller 210 could average the orientations it calculates from multiple matching horizon features to yield a more accurate orientation.

Step 4a has been described as providing precise matches. However, in practice, a precise match may be unlikely. For example, the horizon feature in a horizon feature set may only match a horizon feature in a horizon map at 80% or some other percentage (e.g., due to clouds, time of day variations, size or shape variations due to the location of the mower within the defined area, capturing of only a portion of the horizon feature in the image, etc.). Accordingly, in some embodiments, autonomy controller 210 may combine orientations calculated from multiple matching horizon features using a weighted algorithm such as a weighted average. For example, if a first horizon feature matches at 90% and a second horizon feature matches at 50%, the orientation calculated from the first horizon feature may be weighted more heavily than the orientation calculated from the second horizon feature when combining the calculated orientations to yield the presumed orientation of the mower.

Figure 7E:
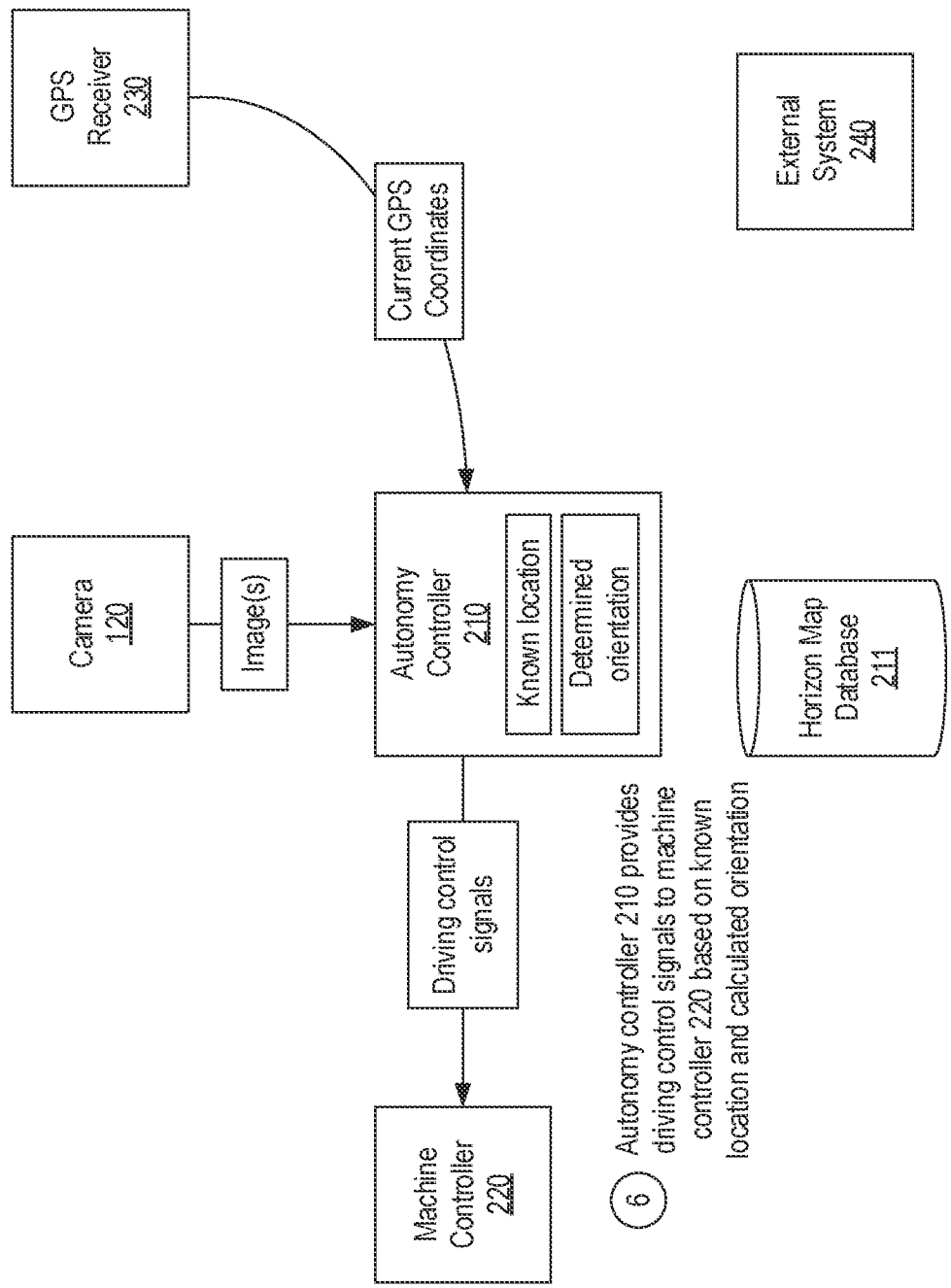

Turning to FIG. 7E, regardless of the exact manner in which autonomy controller 210 determines the orientation of mower 100, in step 5, autonomy controller 210 can employ the determined orientation in conjunction with the known location and current images to calculate and provide driving control signals to machine controller 220. Notably, if, based on the current location or the current images, autonomy controller determines that mower 100 is near an obstacle, it can use the determined orientation to provide driving control signals that will cause mower 100 to avoid the obstacle. For example, the current GPS coordinates may reveal that mower 100 was parked adjacent to a building. Using the horizon mapping techniques described herein, autonomy controller 210 can determine that mower 100 is oriented with its rear facing the building and can therefore provide driving control signals to cause machine controller 220 to drive mower 100 in a forward direction.

In some embodiments, after autonomy controller 210 has determined the orientation of mower 100, it may use the determined orientation and the horizon feature set from which it was determined, to update any applicable horizon map or to create a new horizon map. In some embodiments, autonomy controller 210 may first confirm whether the orientation was accurately determined (e.g., by commencing travelling in a straight line and using GPS coordinates to confirm the orientation of mower 100) and may then update any applicable horizon map. For example, if after commencing travelling, autonomy controller 210 determines that the determined orientation was off by one degree, it may adjust the relative positions assigned to any matching horizon features that were used to arrive at the determined orientation.

In the above-described embodiments, it has been assumed that horizon map database 211 and image processor 210a are located on mower 100. However, either or both horizon map database 211 or image processor 210a could be implemented on external system 240. For example, autonomy controller 210 could use a network connection to access horizon map database 211 and image processor 210a in the cloud, on a server or on another computing device external to mower 100. Accordingly, in some embodiments, autonomy controller 210 may be implemented as a distributed system.

In some embodiments, autonomy controller 210 may be configured to present the determined orientation to a user (e.g., via external system 240) for confirmation of the orientation prior to driving. In some embodiments, autonomy controller 210 could present the determined orientation to the user only when it is unable to determine the orientation with a particular level of confidence. For example, if no horizon feature matches in excess of 50%, autonomy controller 210 may require user approval before proceeding with a determined orientation.

In summary, a control system of a mower can be configured to automatically determine the orientation of the mower while the mower is stationary using only an image or images that capture the horizon from the mower's current viewpoint. By employing horizon mapping techniques to determine the orientation, the control system can safely and autonomously control the mower without the need of multiple GPS or other sensor systems. Although embodiments of the present invention have been described in the context of a mower, the horizon mapping techniques could be implemented by a control system on other types of vehicles to determine the vehicles' orientations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower comprising:
a main body;
one or more mower decks supported by the main body;
a camera;
an autonomy controller that is configured to receive one or more images from the camera; and
a machine controller that controls a ground speed of the mower;
wherein the autonomy controller is configured to perform a method for determining an orientation of the mower using horizon mapping, the method comprising:
receiving, from the camera, an image that captures the horizon, the horizon being an outline of where the sky meets the earth's surface or objects on the earth's surface;
generating, from the image, a horizon feature set, the horizon feature set identifying at least one horizon feature that appears in the image and a position of the at least one horizon feature within the image, each of the at least one horizon feature comprising an identifiable portion of the horizon;
comparing the horizon feature set to a first horizon map, the first horizon map identifying horizon features and relative positions of the horizon features;
based on the comparison, determining that a first horizon feature of the at least one horizon feature identified in the horizon feature set matches a first horizon feature of the horizon features identified in the first horizon map; and determining an orientation of the mower from the position of the first horizon feature within the image as defined in the horizon feature set and the relative position of the first horizon feature as defined in the first horizon map.

2. The mower of claim 1, wherein generating the horizon feature set comprises processing the image to generate image-based data defining the at least one horizon feature.

3. The mower of claim 2, wherein comparing the horizon feature set to the first horizon map comprises comparing the image-based data defining the at least one horizon feature to image-based data defining the horizon features within the first horizon map.

4. The mower of claim 1, wherein determining that the first horizon feature of the at least one horizon feature identified in the horizon feature set matches the first horizon feature of the horizon features identified in the first horizon map comprises determining that image-based data defining the first horizon feature of the at least one horizon feature identified in the horizon feature set at least partially matches image-based data defining the first horizon feature of the horizon features identified in the first horizon map.

5. The mower of claim 1, wherein determining that the first horizon feature of the at least one horizon feature identified in the horizon feature set matches the first horizon feature of the horizon features identified in the first horizon map comprises determining that image-based data defining the first horizon feature of the at least one horizon feature identified in the horizon feature set matches image-based data defining the first horizon feature of the horizon features identified in the first horizon map.

6. The mower of claim 1, wherein determining the orientation of the mower from the position of the first horizon feature within the image as defined in the horizon feature set and the relative position of the first horizon feature as defined in the first horizon map comprises calculating a difference between the position of the first horizon feature within the image as defined in the horizon feature set and the relative position of the first horizon feature as defined in the first horizon map.

7. The mower of claim 1, wherein the method further comprises:
based on the comparison, determining that a second horizon feature of the at least one horizon feature identified in the horizon feature set matches a second horizon feature of the horizon features identified in the first horizon map; and
wherein the orientation of the mower is also determined from the position of the second horizon feature within the image as defined in the horizon feature set and the relative position of the second horizon feature as defined in the first horizon map.

8. The mower of claim 7, wherein determining the orientation of the mower from the positions of the first and second horizon features within the image as defined in the horizon feature set and the relative positions of the first and second horizon features as defined in the first horizon map comprises:
calculating a first difference between the position of the first horizon feature within the image as defined in the horizon feature set and the relative position of the first horizon feature as defined in the first horizon map;
calculating a second difference between the position of the second horizon feature within the image as defined in the horizon feature set and the relative position of the second horizon feature as defined in the first horizon map; and
combining the first difference and the second difference.

9. The mower of claim 8, wherein combining the first difference and the second difference comprises averaging the first and second differences.

10. The mower of claim 1, wherein the method further comprises:
generating driving control signals based on the determined orientation; and
providing the driving control signals to the machine controller to thereby cause the machine controller to cause the mower to commence moving.

11. The mower of claim 1, wherein the method further comprises one or more of:
updating the first horizon map based on the determined orientation and the horizon feature set; or
creating another horizon map based on the determined orientation and the horizon feature set.

12. The mower of claim 1, wherein the method further comprises:
determining a current location of the mower; and
selecting, based on the current location of the mower, the first horizon map from among a plurality of horizon maps.

13. The mower of claim 1, wherein the method further comprises:
determining one or more of a current time of day or a current season; and
selecting, based on the one or more of the current time of day or the current season, the first horizon map from among a plurality of horizon maps.

14. The mower of claim 1, wherein the relative positions are relative to a specific direction.

15. A method for determining an orientation of a vehicle using horizon mapping, the method comprising:
receiving, from a camera positioned on the vehicle, an image that captures the horizon, the horizon being an outline of where the sky meets the earth's surface or objects on the earth's surface;
generating, from the image, a horizon feature set, the horizon feature set identifying at least one horizon feature that appears in the image and a position of the at least one horizon feature within the image, each of the at least one horizon feature comprising an identifiable portion of the horizon;
comparing the horizon feature set to a first horizon map, the first horizon map identifying horizon features and relative positions of the horizon features;
based on the comparison, determining that a first horizon feature of the at least one horizon feature identified in the horizon feature set matches a first horizon feature of the horizon features identified in the first horizon map; and
determining an orientation of the vehicle from the position of the first horizon feature within the image as defined in the horizon feature set and the relative position of the first horizon feature as defined in the first horizon map.

16. The method of claim 15, wherein determining that the first horizon feature of the at least one horizon feature identified in the horizon feature set matches the first horizon feature of the horizon features identified in the first horizon map comprises determining that image-based data defining the first horizon feature of the at least one horizon feature identified in the horizon feature set at least partially matches image-based data defining the first horizon feature of the horizon features identified in the first horizon map.

17. The method of claim 15, wherein determining the orientation of the vehicle from the position of the first horizon feature within the image as defined in the horizon feature set and the relative position of the first horizon feature as defined in the first horizon map comprises calculating a difference between the position of the first horizon feature within the image as defined in the horizon feature set and the relative position of the first horizon feature as defined in the first horizon map.

18. The method of claim 15, further comprising:
selecting the first horizon map from among a plurality of horizon maps based on one or more of:
a current location of the vehicle;
a current time of day; or
a current season.

19. A control system of a mower comprising:
a camera; and
an autonomy controller that is configured to receive images from the camera, wherein the autonomy controller is configured to determine an orientation of the mower using horizon mapping by:
receiving, from the camera, an image that captures the horizon while the mower is stationary, the horizon being an outline of where the sky meets the earth's surface or objects on the earth's surface;
processing the image to generate image-based data representing a horizon feature that appears in the image, the horizon feature comprising an identifiable portion of the horizon;
comparing the image-based data representing the horizon feature that appears in the image to a first horizon map, the first horizon map identifying horizon features and relative positions of the horizon features;
based on the comparison, determining that a first horizon feature of the horizon features identified in the first horizon map is a match;
determining a difference between the relative position of the first horizon feature of the horizon features identified in the first horizon map and a position within the image of the image-based data representing the horizon feature; and
calculating the orientation of the mower based on the determined difference.

20. The control system of claim 19, wherein the relative position of the first horizon feature of the horizon features identified in the first horizon map is relative to a known direction.

* * * * *